United States Patent [19]

Pledger

[11] 3,957,356

[45] May 18, 1976

[54] SYSTEM FOR SIMULATING MISSILE TARGET MOTION USING STEERING MIRRORS

[75] Inventor: Richard Payne Pledger, Fort Worth, Tex.

[73] Assignee: The United States of America as represented by the Secretary of the Air Force, Washington, D.C.

[22] Filed: Mar. 28, 1975

[21] Appl. No.: 563,252

[52] U.S. Cl. .................................... 350/301; 350/6; 350/285

[51] Int. Cl.[2] ...................... G02B 5/08; G02B 27/17

[58] Field of Search ................ 350/301, 6, 285, 26, 350/23; 250/203 R; 35/12 N, 12 F; 244/3.16, 3.17; 353/10, 11

[56] References Cited

UNITED STATES PATENTS 3,420,594 1/1969 Chapman .............................. 350/6

*Primary Examiner*—John K. Corbin
*Assistant Examiner*—Jon W. Henry
*Attorney, Agent, or Firm*—Joseph E. Rusz; Henry S. Miller, Jr.

[57] ABSTRACT

A system for reflecting a collimated beam of radiation with two mirrors including a gimbal mount, steering rod, an articulated spatial parallelogram linkage for one mirror, a pivot joined to one joint of the parallelogram for the second mirror and a pivoted frame and parallelogram mechanism for supporting the mirrors.

3 Claims, 5 Drawing Figures

FIG. 1
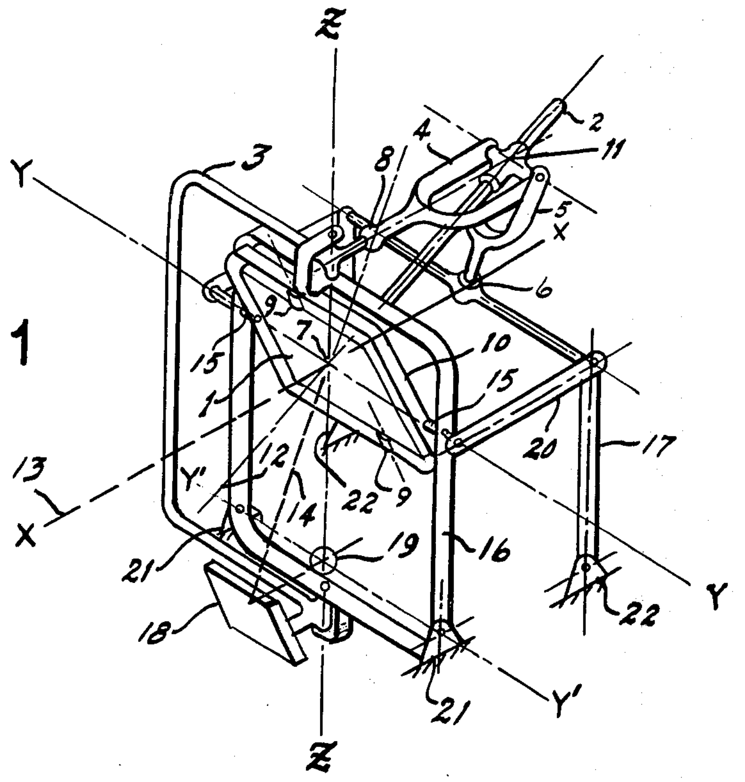
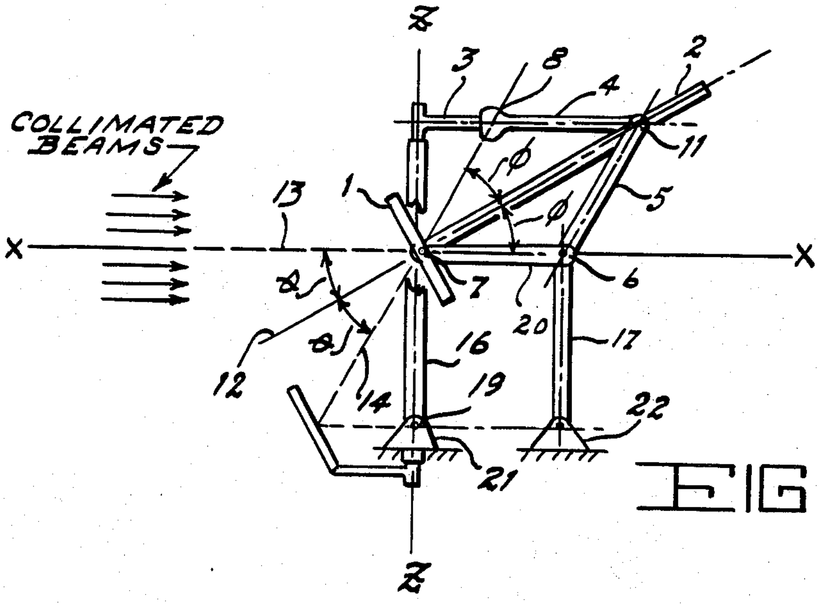
FIG. 2

SYSTEM FOR SIMULATING MISSILE TARGET MOTION USING STEERING MIRRORS

BACKGROUND OF THE INVENTION

This invention relates generally to a system for simulating missile target motion. More particularly the invention relates to a mechanical device especially adapted to reflect a collimated beam of radiation along an optical path with two mirrors, in two planes in a precise manner.

In the past, the simulation of target motion in missile testing has involved mechanically positioning the target in front of the missile, or, in the case of an infrared guided missile, mechanically positioning a set of mirrors to reflect the target image from a fixed source to the missile. Apparent target motion is accomplished by moving one or more mirrors in one or more planes and maintaining an optical path from the source to the missile. Each mirror must be positioned in a manner such taht the mirror reflects the image, beam, or light ray according to the law of mirror reflection, viz. : the angle of incidence is equal to the angle of reflection. Accordingly, the angle between the incident and reflected rays is twice the angle of incidence, and the normal line to the plane of the mirror bisects this angle. The task of precisely directing a reflected image or beam involves positioning the mirror such that the normal to the mirror bisects the subtended angle between the source of the beam and the desired position of the beam. Each mirror must, therefore, be positioned in two planes requiring calculations in a suitable space coordinate system. These calculations require a substantial amount of time to determine. Additionally elaborate, graduated mechanical devices are required to incorporate the calculations into a mirror steering system.

SUMMARY OF THE INVENTION

The invention consists of a first mirror gimbally mounted in a frame. The frame is connected to a base by means of trunnions near one end and an assemblage of links near the other end. A pair of bifurcated links, having a universal swivel connection at one end are joined together at the bifurcated ends and to the assemblage and frame at the other end. A rod, forming a normal to the mirror passes through a slider bearing mounted at the point where the bifurcated links are joined. Attached to the frame and connected to one end of the bifurcated link is an arm which is pivotally mounted along one axis of the gimballed mirror, on opposite sides of the frame. Attached to the arm is a second mirror which receives radiation reflected incident to the gimbally mounted mirror.

In the described arrangement the mirrors always remain in relative position with each other in two planes, regardless of whether the rotation is about the $x$, $y$ or $z$ axis.

It is therefore an object to provide a new and improved system for simulating missile target motion.

It is another object of the invention to provide a new and improved system for simulating missile target motion in two planes.

It is a further object of the invention to provide a new and improved system for simulating missile target motion with a collimated beam of radiation.

It is still another object of the invention to provide a new and improved system for simulating missile target motion by directing and steering a collimated beam of radiation with a coordinated pair of mirrors.

It is still a further object of the invention to provide a new and improved system for simulating missile target motion with radiation reflected from mirrors that are simple and easy to minipulate and require no computation periods before operation.

It is another object of the invention to provide a system for simulating missile target motion which is economical to produce and utilizes conventional, currently available components that lend themselves to standard mass production manufacturing techniques.

These and other advantages, features and objects of the invention will become more apparent from the following description taken in connection with the illustrative embodiment in the accompanying drawings.

DESCRIPTION OF THE DRAWINGS

FIG. 1 is an isometric view of the invention.

FIG. 2 is a side view of the invention depicted in FIG. 1.

DESCRIPTION OF THE PREFERRED EMBODIMENT

Figure 3:
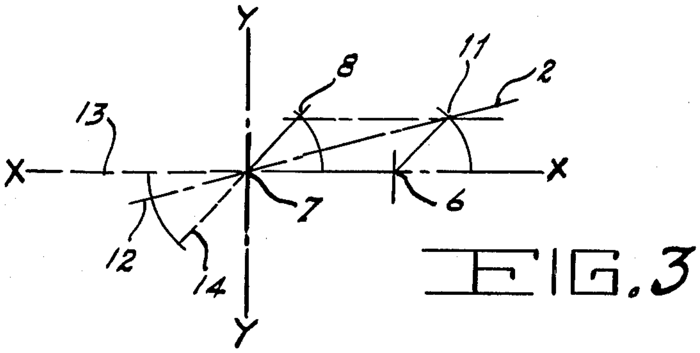
FIG. 3 is a diagram characterizing a top view of the invention.

Referring to the drawings and particularly FIG. 1 a mirror 1 is located at the origin 7 of mutually orthogonal axis $x—x$, $y—y$, $z—z$. The mirror 1 is mounted on gimbal 10 at pivots 9. Gimbal 10 is pivoted about axis $y—y$ on trunnions 15. Connected to the mirror and forming a normal to the mirror is rod 2. Bifurcated links 4 and 5, along with fixed length from point 6 to point 7 and fixed length from point 7 to point 8, form a rhombic parallelogram. The rod 2 connected at one end to mirror 1 passes through a slider bearing 11. Bearing 11 is located at the vertex of the parallelogram opposite the vertex 7. Arm 3 is pivoted to rotate about axis $z—z$; point 8 remains at a constant distance from point 7 for all angular positions of arm 3. Joints 6 and 8 are universal swivel type.

The gimballed mirror is supported on frame 16 which is pivoted along axis $y'—y'$ on supports 21. Swivel joint 6 is supported by links 17 which are pivoted on supports 22. Link 17 is identical in length to the distance from axis $y—y$ to axis $y'—y'$. Fixed length from point 6 to point 7 is maintained by links 20. Planer distance from pivots 21 to pivots 22 is identical to the fixed length from point 6 to point 7. Frame 16, links 17 and 20 therefore form a parallelogram mechanism to maintain axis x-x level for all angular positions of frame 16.

Rod 2 is a diagonal in the parallelogram 6-7-8-11. Rod 2 bisects the angle formed by side 6-7 and 7-8 of the parallelogram; the parallelogram angle formed by sides 6-11 and 11-8 is also bisected by rod 2.

A ray 13 of a collimated beam forms angle $\theta$ with mirror normal 12 and is reflected by mirror 1. The reflected ray 14 forms angle $\theta$ with normal 12. Normal 12 is the angle bisector of the angle $2\theta$ between 13 and 14.

If ray 13 is coincident with axis $x—x$, angle $\theta$ will be equal to angle $\phi$ between axis 6–7 and rod 2. Likewise angle $\theta$ between reflected ray 14 and normal 12 will be equal to angle $\phi$ between axis 7-8 and rod 2. Ray 14 is then coincident with axis 7-8. The relationship of each corresponding angle remains true for all possible angles of reflection. Axis 6-7 is the analog of ray 13, axis 7-8 is the analog of ray 14, axis 7-11 is the analog of normal 12, all on the reverse side of the mirror.

Rotation of arm 3 about axis z-z displaces parallelogram 6-7-8-11 out of the $x$–$z$ plane; the parallelogram remains planer, however, and remains rhomboid in the skew plane. Rod 2 remains in the plane of the rhomboid. The skew plane determined by rod 2 and axis 6-7 is established by ray 13 and normal 12 on the front side of mirror 1. Axis 6-7 describes a cone and point 8 describes a circle for displacement of arm 3. Ray 14 describes a cone.

Concerning FIG. 2, a mirror 18 placed along ray 14 will reflect the beam to a point 19 on the $z$—$z$ axis. Angular displacement of mirror 18 with arm 3 along the $z$—$z$ axis will direct the beam to point 19 from radials of point 19.

Figure 4:
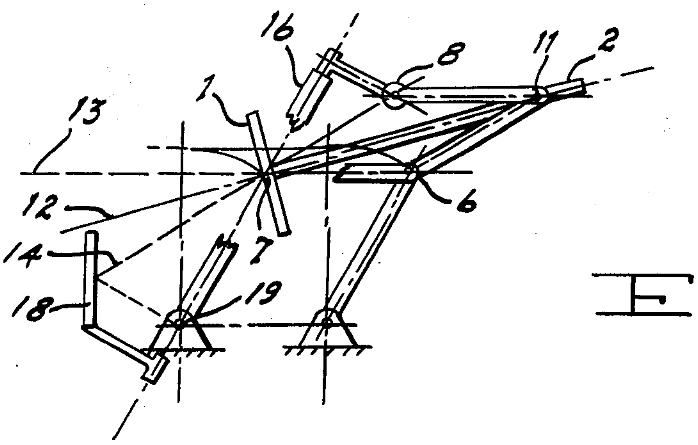
FIG. 4 is a side view of the invention illustrating the geometry of the invention in one displaced position.
Figure 5:
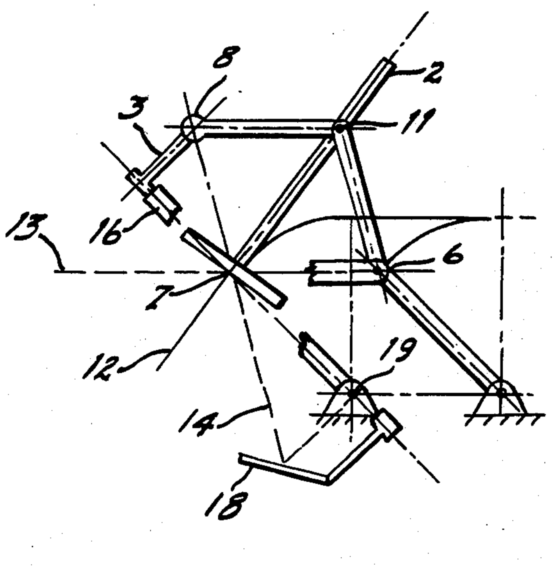
FIG. 5 is a side view of the invention illustrating the geometry of the invention in a second displaced position.

Referring to FIGS. 4 and 5, angular displacement of frame 16 displaces mirror 1 and therefore translates the origin 7 of the orthogonal axis $x$—$x$, $y$—$y$, and $z$—$z$ to a new position. The orthogonal axis $x$—$x$, $y$—$y$, and $z$—$z$ remain parallel to their respective directions, however. Axis x-x remains coincident with rays of the collimated beam since links 20 remain level for displacement of frame 16. Parallelogram 6-7-8-11 remains rhomboid and reflected ray 14 is still directed to mirror 18.

Displacement of frame 16 displaces mirror 18 in the $x$–$z$ plane about point 19. Ray 14 is reflected by mirror 18 to point 19 since its original angle of incidence did not change. The reflected beam is therefore directed to point 19 in the $x$–$z$ plane for all displacements of frame 16.

The reflected beam is therefore directed to point 19 for all simultaneous displacements of link 3 in the horizontal plane and frame 16 in the fore-aft plane. A missile placed at point 19 will be presented with the collimated beam from radials for all practical angles of reflectioon for mirror 1. Displacement of link 3 and frame 16 are simple, direct input functions in terms of missile body or earth coordinate systems, and mirror angle calculations are eliminated.

In the constructional form illustrated in FIG. 1, a collimated beam may be directed to simulate missile target motion in two planes to a point in space from a radial direction by positioning the device such that axis 6-7 is coincident with the collimated beam.

Although only the preferred embodiment of devices for carrying out the inventon have been described above, it is not to be construed that my invention is limited to such embodiments. Other modifications may be made by those skilled in the art without departing from the spirit and scope of the invention.

What is claimed is:

1. A system for simulating missile target motion using steering mirrors comprising: a gimbal; a first mirror pivotally mounted within the gimbal; a base; a frame pivotally mounted on said base and adapted to support said gimbal; a first pair of parallel links pivotally mounted on the base; a second pair of parallel links connecting said first pair of parallel links to said frame; means connecting one pair of first and second parallel links to another pair of first and second parallel links and maintaining the one pair in a spaced relationship to the other pair; a first bifurcated link at one end connected to sad means; a second bifurcated link at one end connected to said first bifurcated link; a slider bearing means connecting the first and second bifurcated links; an arm, pivotally mounted to the frame, connected to one end of said second bifurcated link; a second mirror mounted on said arm; and a steering rod attached normal to said first mirror and extending through said slider bearing means, whereby movement of said first mirror by the steering rod will coordinate the movement of the second mirror and the angular relationship between said mirrors will remain constant.

2. A system for simulating missile target motion using steering mirrors according to claim 1 wherein said first and second bifurcated links have a universal swivel type joint at one end.

3. A system for simulating missile target motion using steering mirrors according to claim 1 wherein said arm is pivotally mounted to the frame at two points along a common axis with said first mirror.

* * * * *